June 25, 1963 R. H. LEBOW 3,095,179
VALVE ASSEMBLY SEAL MEANS
Filed Aug. 3, 1959
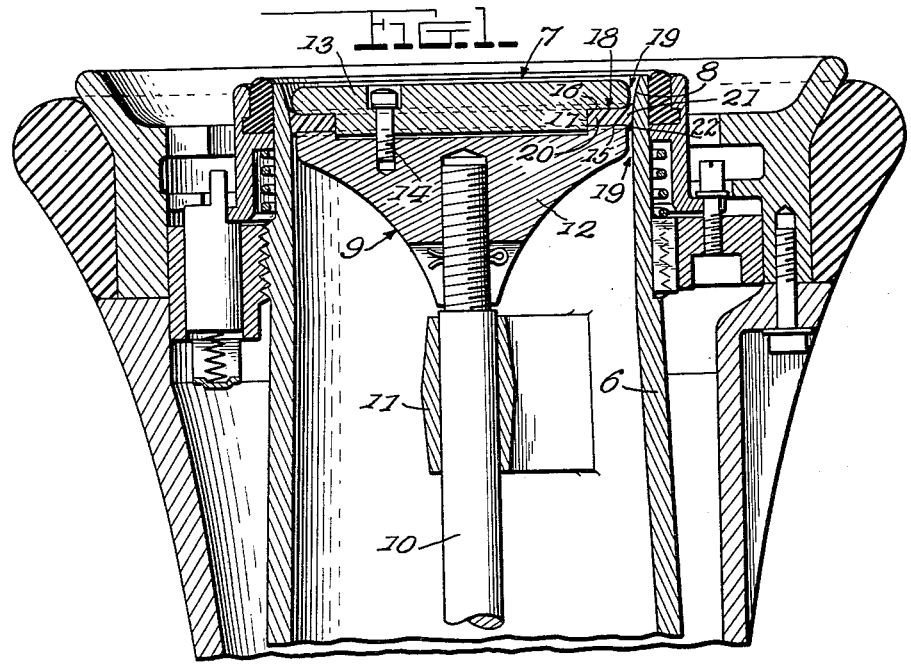
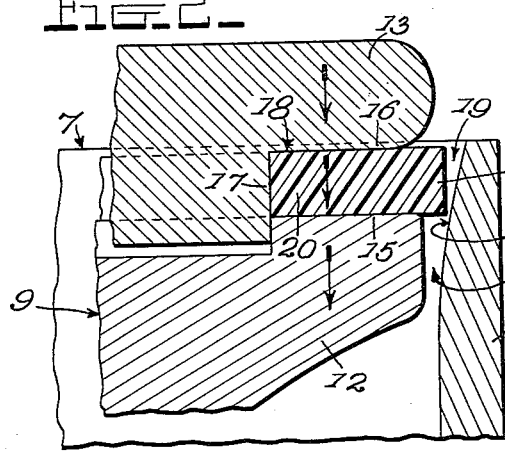
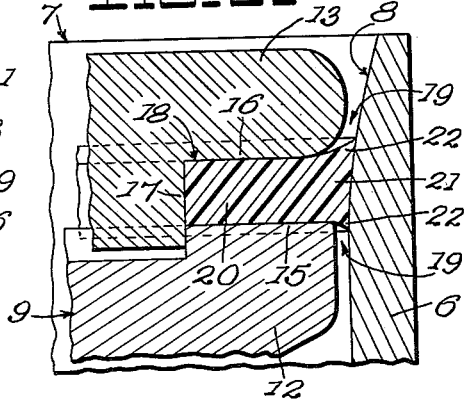
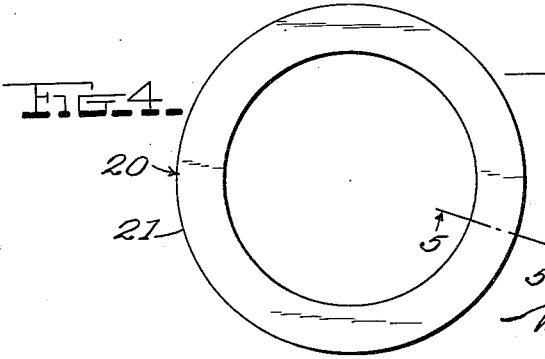
INVENTOR
Ralph H. Lebow.
BY
Mason, Porter, Diller & Stewart
ATTORNEYS 3,095,179
Patented June 25, 1963

3,095,179
VALVE ASSEMBLY SEAL MEANS
Ralph H. Lebow, Pacific Palisades, Calif., assignor to Parker-Hannifin Corporation, Cleveland, Ohio, a corporation of Ohio
Filed Aug. 3, 1959, Ser. No. 831,350
1 Claim. (Cl. 251—333)

This invention relates to a new and improved sealing ring carried by a valve which is movable into and out of an open end of a fluid-conducting member, as in United States Patent 2,679,407, issued May 25, 1954 to E. H. Badger, Jr. The element 11 of this patent is the fluid-conducting member in question, and the valve is shown at 35. This valve has a sealing ring 39 which corresponds positionally to the sealing ring of the present application. The sealing ring of the patent, however, has not been as durable and effective as desired and has necessitated that it be replaced rather frequently with a new ring. Moreover, the sealing ring of the patent is of such form as to require special shaping of the valve head 36 and disk 37 between which said ring is clamped.

The present invention has aimed to overcome the above objections and has been found to attain that end.

With the above and other objects in view that will hereinafter appear, the nature of the invention will be more clearly understood by reference to the following detailed description, the appended claim and the several views illustrated in the accompanying drawing.

In the drawing:

FIGURE 1 is a fragmentary vertical sectional view of a valve assembly corresponding generally to a portion of FIGURE 1 of the above mentioned patent but disclosing the improved sealing ring embodied in said assembly.

FIGURE 2 is an enlarged fragmentary sectional view showing the improved sealing ring secured to the valve and entering the fluid conducting member for the first time.

FIGURE 3 is a similar view but showing the sealing ring in sealing position and condition.

FIGURE 4 is a face view of either side of the sealing ring, prior to installation.

FIGURE 5 is a typical radial section of the sealing ring, for example, on line 5—5 of FIGURE 4.

In the accompanying drawing, a liquid conducting member 6 has an open upper end 7 and an internal flare 8 extending to said open end, said flare being preferably curved as shown.

A valve 9 is carried by the upper end of a stem 10 which is slidably mounted at 11 to permit movement of said valve 9 into and out of the open end 7 of the liquid conducting member 6. The valve 9 comprises a head 12, and a clamping disk 13 secured to the upper end of said head by screws 14. The head 12 and disk 13 have coacting portions 15, 16 and 17 providing the valve 9 with a flat-sided, relatively deep and narrow groove 18 which opens through the periphery of said valve. The portions 15 and 16 constitute flat parallel sides for the groove 18, and the portion 17 forms the groove bottom. The head 12 and disk 13 are of somewhat smaller diameter than the valve-receiving portion of the liquid-conducting member 6, to leave a continuous space 19 between this member 6 and said head and said head and disk when the valve 9 is within said member 6.

A flat, plastic sealing ring 20 is seated in the groove 18 and tightly clamped between the head 12 and disk 13. This plastic sealing ring has the following characteristics:

(1) It is extremely tough,
(2) It is comparatively stiff,
(3) It is relatively hard,
(4) It is deformable under pressure,
(5) It will retain some degree of set upon termination of the deforming pressure,
(6) It is sufficiently resilient to return somewhat toward its original state when the deforming pressure is relieved, and
(7) It is endowed with an extremely smooth, wax-like exterior.

To impart these characteristics to the sealing ring 20, this ring is preferably formed from Teflon, a modern plastic technically known as polyfluorethylene. This plastic also possesses the qualities of immunity to injury by contact with a wide variety of liquids and gases, and immunity to appreciable physical change over a wide range of temperature variances.

The flat sealing ring 20 and groove 18 are so relatively dimensioned that upon assembly, said ring will completely fill and be tightly clamped in said groove, and the outer edge portion 21 of said ring will project from said groove as shown in FIGURE 2. This view shows the valve 9 being moved into the liquid-conducting member 6 for the first time, at the factory or other place of assembly, and the sealing ring 20 has entered the flare 8. FIGURE 2 also shows that initially the outer diameter of the ring 20 is less than the larger diameter of the flare 8 and greater than the smaller diameter of said flare 8.

As the first inward movement of the valve continues, the outer edge portion 21 of the sealing ring 20 abuts and slides downwardly upon the flare 8. Consequently, this flare 8 inwardly compresses the edge portion 21 toward the groove bottom 17. As any compressible body, when compressed in one direction, will expand in other directions if not restrained, the inward compression of the outer edge portion 21 of the ring 20 will result in upward and downward expansion of said outer edge portion 21, into the space 19, as shown at 22 in FIGURE 3. The ring 20 thus becomes provided with a thickened sealing portion 21, 22, 22 which is sufficiently stiff to resist distortion under fluid pressure, yet is sufficiently resilient to tightly seal. This thickened sealing portion is tough, and it is self-lubricating due to the wax-like exterior of the ring. Wear is thus negligible and the ring consequently has unusual life and effectivenes.

The set given to the sealing portion 21, 22, 22 by movement of the valve 9 into the member 6, will be retained to a large extent when the valve is moved to open position above the member 6. However, when the sealing portion 21, 22, 22 leaves the flare 8, some of the set is lost, due to the resiliency of the material and the compressed outer edge portion 21 of the ring expands somewhat toward its original diameter. This assures that recompression of the portion 21 shall occur when the valve 9 is again moved to the closed position of FIGURE 3, and said recompression assures tight sealing contact with the member 6. Due to the nature of the ring material, the friction existing between the thickened edge portion 21, 22, 22 and the member 9 is negligible and does not interfere with operation of the valve.

Various elements, extraneous to the present invention, are shown in FIGURE 1 of the drawing, for purposes of environment. These elements, however, are structurally and functionally the same as corresponding elements in the above mentioned Patent 2,679,407 and require no description herein.

From the foregoing it will be seen that novel provision has been made for attaining the desired end. However, attention is invited to the possibility of making minor variations.

What is claimed is:

In a valve assembly, a fluid-conducting member having a straight line bore with an open end and an internal flare extending to said open end, said flare being convexly rounded in section and extending gradually tangentially away from said bore, said flare including a valve seat portion, a valve seated on said valve seat portion, said valve comprising a head and a clamping disk secured together and having portions coacting in forming a relatively radially deep and axially narrow flat-sided groove including upper and lower coacting surfaces which terminate substantially identically at the periphery of said valve, said head and disk being of smaller diameter than the valve-seat portion of said fluid-conducting member thereby leaving a continuous space between the surface of the valve-seat portion and said head and disk, and a flat-sided sealing ring of a uniform cross-section configuration including upper and lower peripheral edges, said sealing ring being formed of polyfluorethylene seated in the aforesaid groove and tightly clamped between said head and disk, said sealing ring having an outer peripheral surface portion which terminates in an initially cylindrical sealing surface which projects beyond the periphery of the aforesaid head and disk, the initial diameter of said sealing ring being less than the largest diameter of said flare and only slightly greater than the diameter of said valve-seat portion, said upper peripheral edge of said sealing ring being peripherally deformed toward said disk and said lower peripheral edge of said sealing ring being peripherally deformed toward said head and into said continuous space between said head and said flare whereby said plastic sealing ring has a thickened outer peripheral sealing portion in engagement with said valve-seat portion and conforming to the opposed surface of said flare, said sealing portion being sufficiently stiff to resist distortion under fluid pressure yet sufficiently resilient to tightly seal the open end of said fluid-conducting member.

References Cited in the file of this patent

UNITED STATES PATENTS

| | | |
|---|---|---|
| 1,365,369 | Boyce | Jan. 11, 1921 |
| 1,403,263 | Mueller | Jan. 10, 1922 |
| 1,686,849 | Frauenheim | Oct. 9, 1928 |
| 2,680,030 | Hoelzer | June 1, 1954 |
| 2,784,732 | Nurkiewicz | Mar. 12, 1957 |
| 2,875,978 | Kmiecik | Mar. 3, 1959 |
| 2,893,687 | Huthsing | July 7, 1959 |
| 2,930,401 | Cowan | Mar. 29, 1960 |